UNITED STATES PATENT OFFICE.

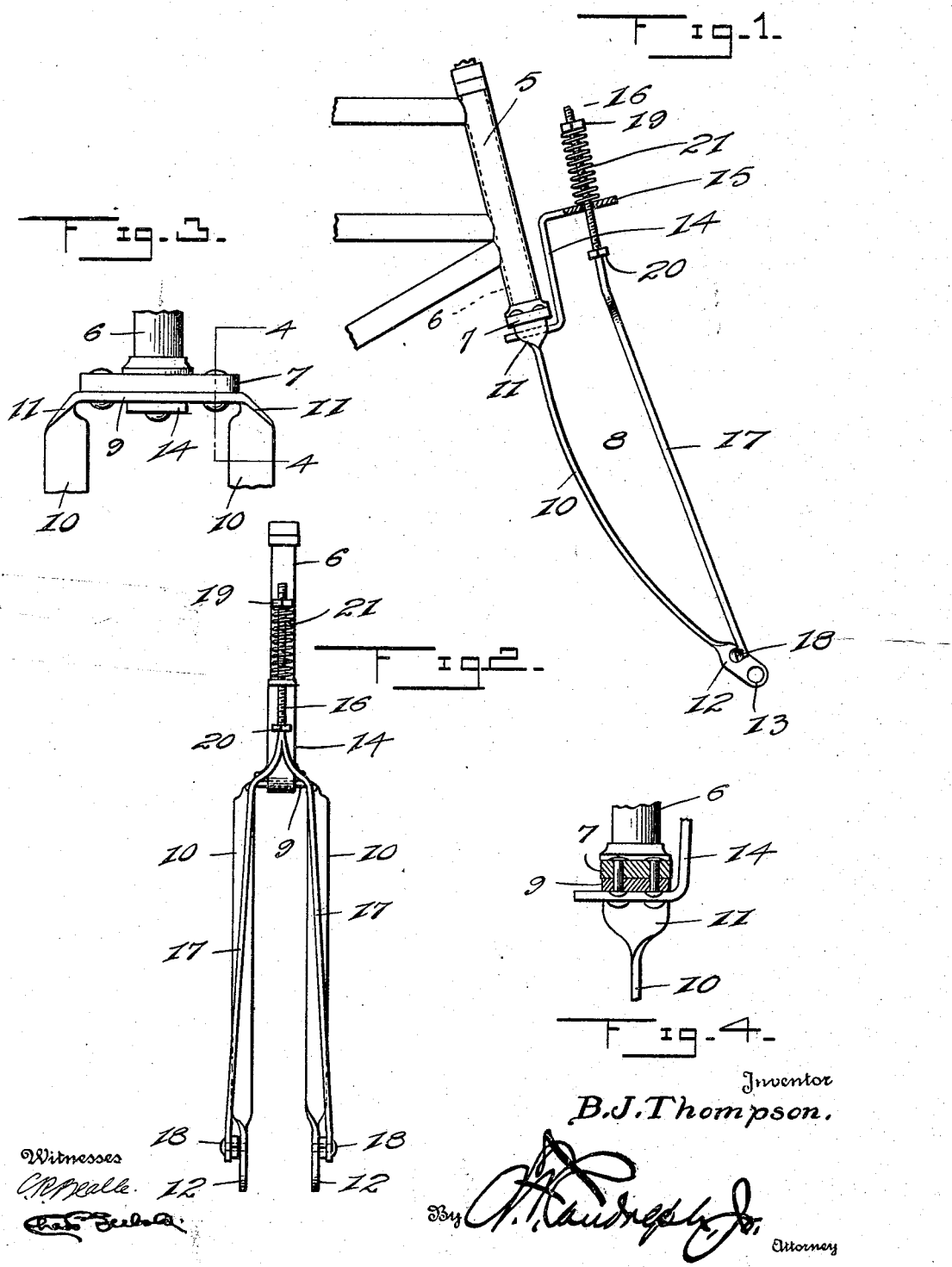

BULA J. THOMPSON, OF ROBSTOWN, TEXAS.

SPRING BICYCLE-FORK.

1,199,631.                    Specification of Letters Patent.    Patented Sept. 26, 1916.

Application filed October 26, 1915.   Serial No. 57,968.

*To all whom it may concern:*

Be it known that I, BULA J. THOMPSON, a citizen of the United States, residing at Robstown, in the county of Nueces and State of Texas, have invented certain new and useful Improvements in Spring Bicycle-Forks, and I do hereby declare the following to be a full, clear, and exact description of the invention, such as will enable others skilled in the art to which it appertains to make and use the same.

This invention relates to the frame construction of motorcycles, bicycles and similar two wheeled vehicles, and has for its primary object to provide a novel and efficient type of spring fork for the front wheel of the vehicle which will require practically no variation in the standard types of two wheeled vehicles.

Another object is the provision of a spring fork for bicycles and the like embodying effective means for absorbing the recoil movement of the spring forks.

With this and other objects in view, the invention consists in the novel construction, arrangement and formation of parts as will be hereinafter specifically described, claimed and illustrated in the accompanying drawing, in which:

Figure 1 represents a fragmental side elevation of the front end of a bicycle frame, illustrating the improved spring fork applied thereto, Fig. 2 represents a front elevation of the spring forks and the head of the bicycle, Fig. 3 represents an enlarged front elevation, partly broken away of the connecting web between the spring forks and steering post carried thereby, and Fig. 4 represents a fragmental transverse sectional view on the line 4—4 of Fig. 3.

Referring to the drawing in detail, wherein similar reference numerals designate corresponding parts throughout the several views, the numeral 5 indicates the head of a bicycle or similar two wheeled vehicle, in which is rotatably fitted a steering post 6, having a head or crown 7 at its lower extremity.

The spring fork, designated generally by the numeral 8, is formed of a strip of flat spring metal of adequate thickness bent centrally on transverse lines to define a connecting web 9 and depending curved spring arms 10. Adjacent the web 9, the arms 10 are twisted, as indicated at 11, so as to increase the resiliency of the arms and thus more effectively absorb the shock to which the vehicle is subjected in traversing rough roads. The lower extremities 12 of the spring arms are also twisted and apertured, as at 13, to receive the axle of the front wheel (not shown).

An angular bracket 14 is rigidly and permanently secured to the connecting web 9 at one end and the opposite end 15 thereof is directed forwardly and horizontally and is apertured to slidably receive the threaded shank 16 of a pair of braces 17 pivotally connected at their lower extremities by pins or screws 18 with the lower extremities 12 of the arms 10 at a point slightly above and rearwardly of the axle-receiving openings 13 therein. Nuts 19 and 20 are fitted upon the shank 16 above and below the angular bracket 14, respectively, the upper nut 19 constituting a stop for the upper extremity of a rebound absorbing spring 21 engaged at its lower extremity with the forwardly directed end 15 of the bracket 14 and coiled about the upper portion of the shank 16. The lower nut 20 constitutes a stop for limiting the upward movement of the shank 16 with relation to the forwardly directed end 15 of the bracket, or if preferred, a second spring may be coiled about the shank 16 and confined between the forward end 15 of the bracket and the nut 20 to assist the spring arms 10 in supporting the load upon the vehicle.

What I claim is:

1. In a vehicle, a fork formed of flat spring material and including a pair of spring arms, having twisted lower axle receiving extremities and a connecting web between the upper extremities of said arms.

2. In a vehicle, a fork formed of flat spring material and including a pair of spring arms having twisted upper and lower extremities, the lower twisted ends being adapted to receive an axle, and a connecting web between the upper extremities of said arms adapted for attachment to the head of the steering post.

3. In a vehicle, a fork formed of flat spring material and including a pair of spring arms having the upper extremities thereof twisted, a connecting web between the upper extremities of said arms adapted for connection with the head of the steering post, the lower ends of said arms being twisted and adapted to receive an axle, and bracing means pivotally connected with the lower extremities of said arms and slidably connected with the upper extremities thereof.

4. In a vehicle, a pair of spring arms, a connecting web between the upper extremities of said arms, an angular bracket carried by said connecting web, braces secured to the lower extremities of said spring arms, a shank carried by said braces slidably engaged with said bracket, and a recoil absorbing spring associated with said shank and bracket.

5. In a vehicle, a pair of spring arms, a connecting web between the upper extremities of said arms, a pair of braces carried by said arms, an angular bracket carried by said connecting web having an aperture therein, a shank carried by said braces slidably engaged in said aperture, a recoil absorbing spring associated with said shank and engaged with said bracket, and adjustable means for limiting the upward movement of said shank with relation to said bracket.

In testimony whereof I affix my signature in presence of two witnesses.

BULA J. THOMPSON.

Witnesses:
ASWIR HEERMANN,
FRANCIS S. CHAMBERS.

Copies of this patent may be obtained for five cents each, by addressing the "Commissioner of Patents, Washington, D. C."